J. G. PAGE.
Automatic Gate.
No. 56,987.
Patented Aug. 7, 1866.
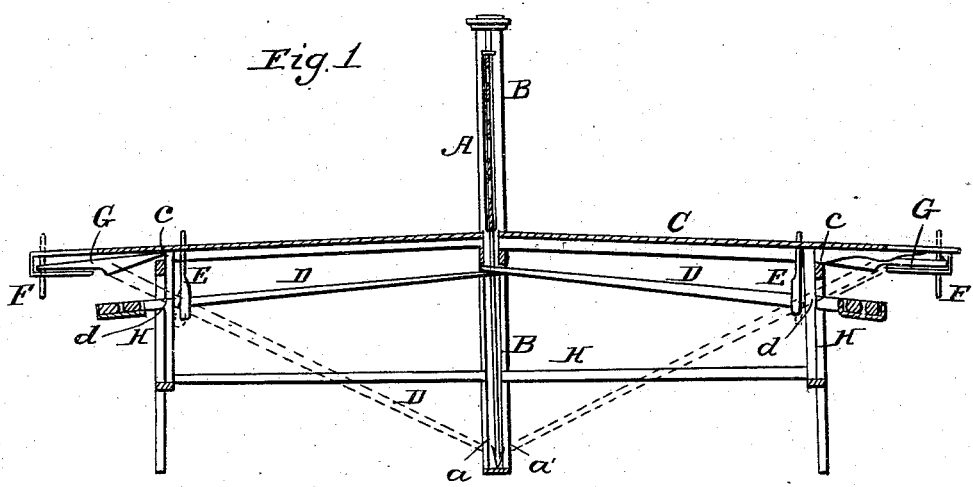
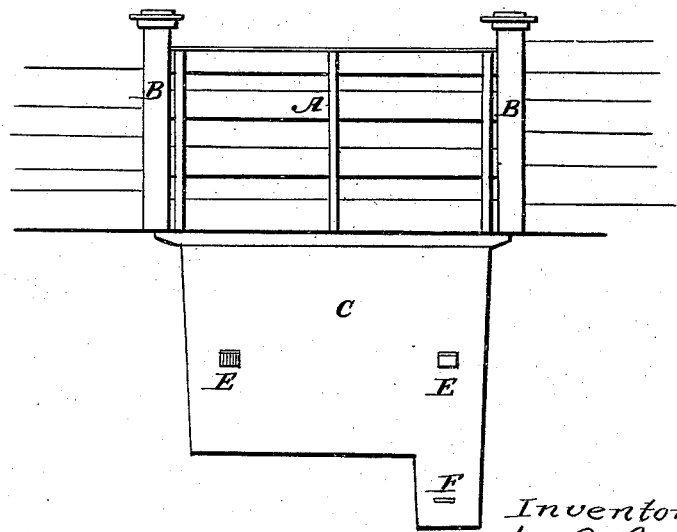
Witnesses:
C. Rowland
Inventor:
John G. Page
by Coburn & Mann
attorneys.

UNITED STATES PATENT OFFICE.

JOHN G. PAGE, OF ROCKFORD, ILLINOIS.

IMPROVEMENT IN AUTOMATIC GATES.

Specification forming part of Letters Patent No. 56,987, dated August 7, 1866.

*To all whom it may concern:*

Be it known that I, JOHN G. PAGE, of Rockford, in the county of Winnebago and State of Illinois, have invented a new and useful Improvement in Automatic Gates; and I do hereby declare that the following is a full, clear, and exact description of the same, reference being had to the accompanying drawings, and the letters and figures thereon, which form part of this specification.

The nature of my invention consists in arranging an adjustable gate having a reciprocating vertical movement, in combination with a lever or series of levers, in such a manner that the gate is opened and closed automatically by the weight of the vehicle passing through the same, as more fully set forth hereinafter.

To enable those skilled in the art to understand how to construct and use my invention, I will proceed to describe the same with particularity, making reference in so doing to the aforesaid drawings, in which—

Figure 1 represents a transverse sectional view of my invention, and Fig. 2 a front elevation of the same.

Similar letters of reference in the several figures denote the same parts of my invention.

A represents the gate, which has a vertical reciprocating movement in grooves in the gate-posts B, said grooved posts extending beneath the platform or carriage-way (marked C) far enough to allow the gate A to descend, so as to lie entirely beneath the said platform C, and thus permit the carriage to pass through. This is accomplished by making a slight excavation beneath the gateway and sloping the platform up toward the center from each end, substantially as shown, any suitable frame, H, being employed to sustain said platform in the desired position.

To the lower edge of the gate, at each end thereof, are attached the long arms of the levers D D, which levers have their fulcrums at *d d*, and whose short arms are weighted, as shown, for the purposes hereinafter mentioned. There are attached to the long arms of said levers near their fulcrums, as shown, the vertical arms, (marked E,) whose upper ends project up through suitable slots in the platform C. Lying immediately over the short arms of said levers D, and pivoted or fulcrumed at *c c*, are the levers G, to the opposite ends of which are attached the vertical arms F, projecting, when desired, and as hereinafter described, up through appropriate slots in C, as shown.

When the various parts are arranged as and in the positions represented by the full lines in Fig. 1, the gate is closed, and the operation of opening and closing the same, when it is desired to pass through the gate, is as follows: As the vehicle and horse approach the gate upon either side, the front wheels strike against the projecting ends of the arms E E upon that side, said arms being arranged in the wheel-tracks to facilitate the operation, and press down said arms, thereby carrying or forcing the levers D D into the position indicated by the dotted lines and opening the gate. As the gate descends and the short arms of said levers ascend, they strike upon the levers G, and, forcing them upward, throw the arms F F up through their appropriate slots in the platform C.

When the ends of the long arms of the levers D reach the bottom, as indicated by the dotted lines, they are held in said position by the pressure of the elastic strips or springs *a a*, which counterbalance the weight upon the short arms, and hold the gate open—that is, below the platform—until closed, as hereinafter described.

The carriage having passed through the gate, moves on, and the front wheel thereof strikes against the then projecting arm F, which, being pressed down thereby, presses down the short arm of the lever D, raising the long arm thereof, and removing it from the pressure of the springs *a a*, when the weight upon the short arms restores the levers to their original position and closes the gate.

The distance between the arms E and the gate is sufficient to allow the front wheels to open the gate in advance of the horse's head, and the distance between the arms E and F is such as to allow the rear wheels to pass the arm F before the front wheels come in contact with the arms E.

Having described the construction and operation of my invention, I will now specify what I claim and desire to secure by Letters Patent:

1. In combination with the vertically-reciprocating gate A, the employment of the levers D and arms E, arranged and operating substantially as and for the purposes herein set forth and described.

2. In combination with the above, the levers G and arms F, arranged substantially as and for the purposes specified.

3. In combination with the levers D, weighted upon their short arms, as described, the employment of the springs $a\ a$, or their equivalent, arranged substantially as set forth.

JOHN G. PAGE.

Witnesses:
SILAS G. TYLER,
JOHN L. PAGE.